United States Patent Office 3,444,585
Patented May 20, 1969

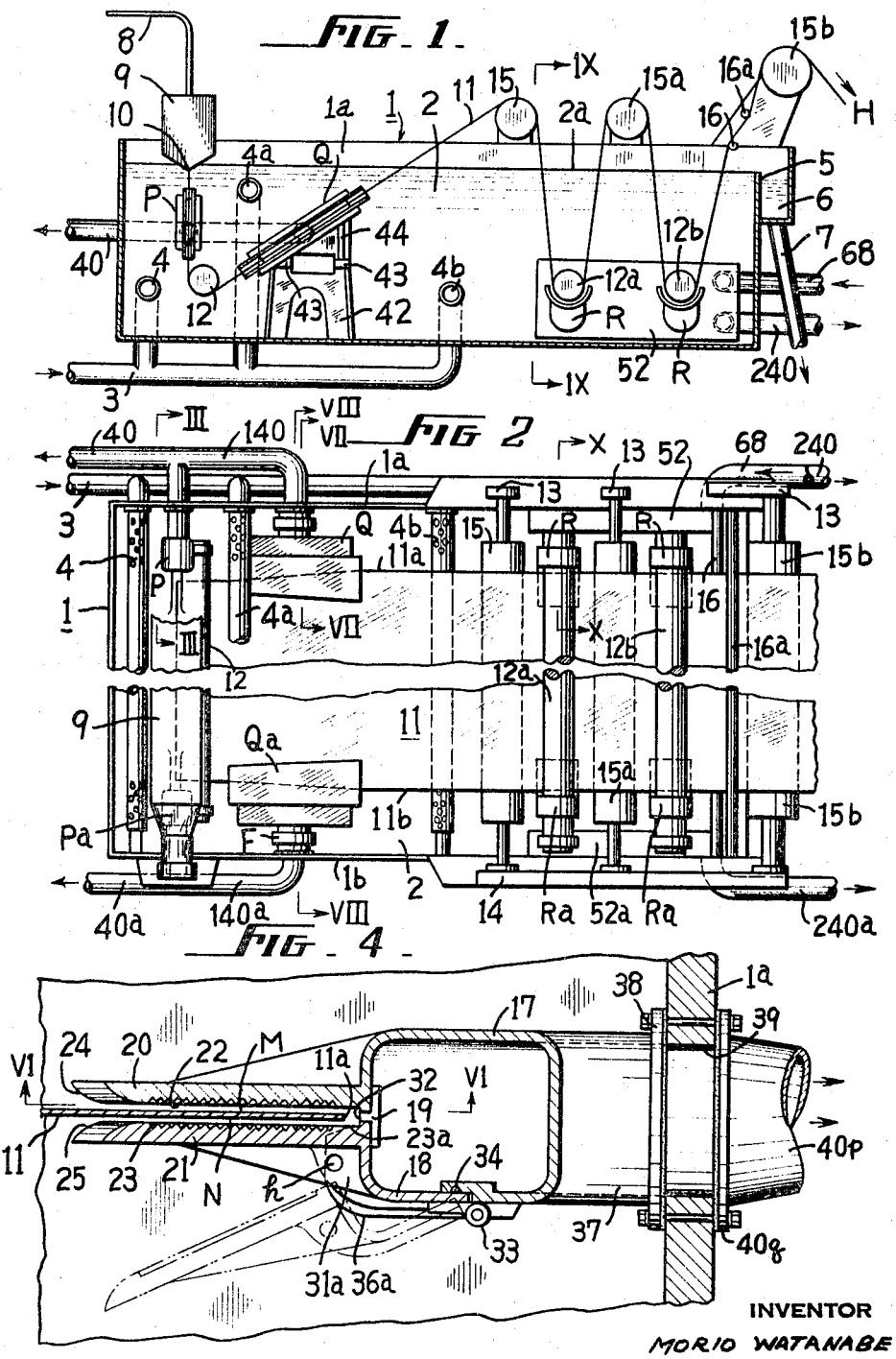

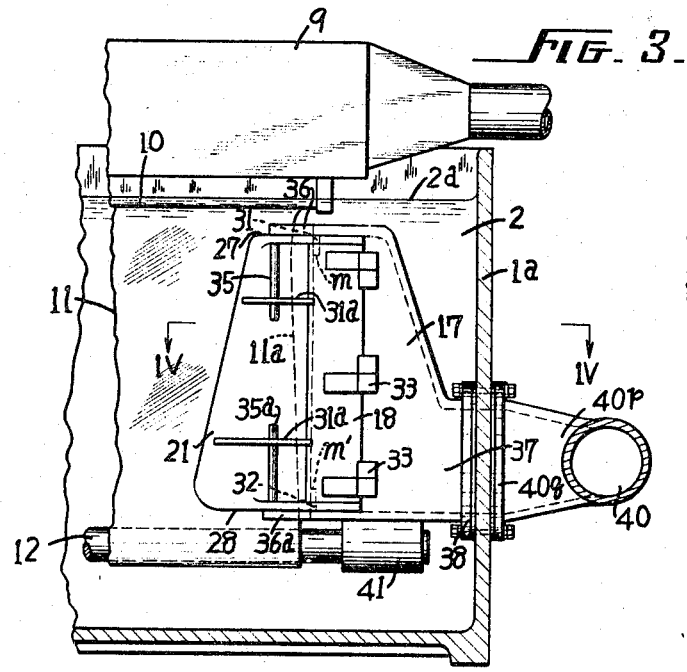
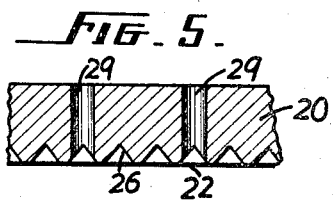
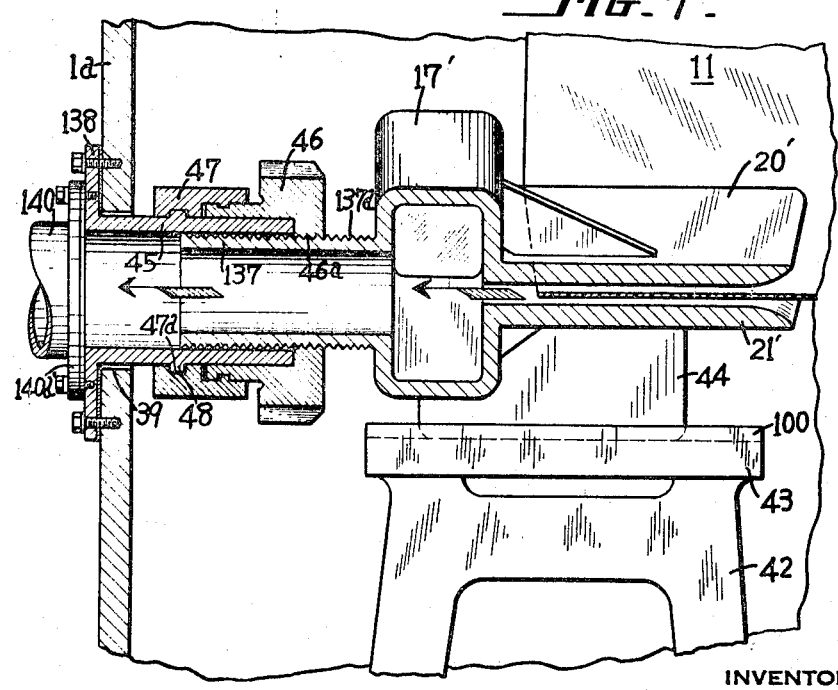

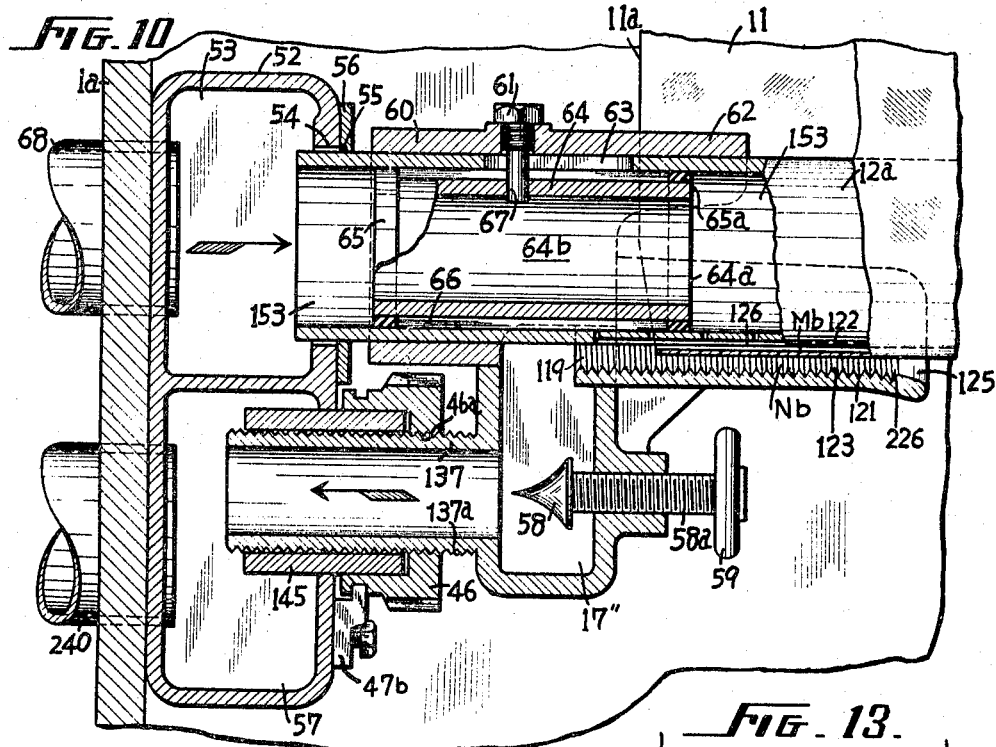
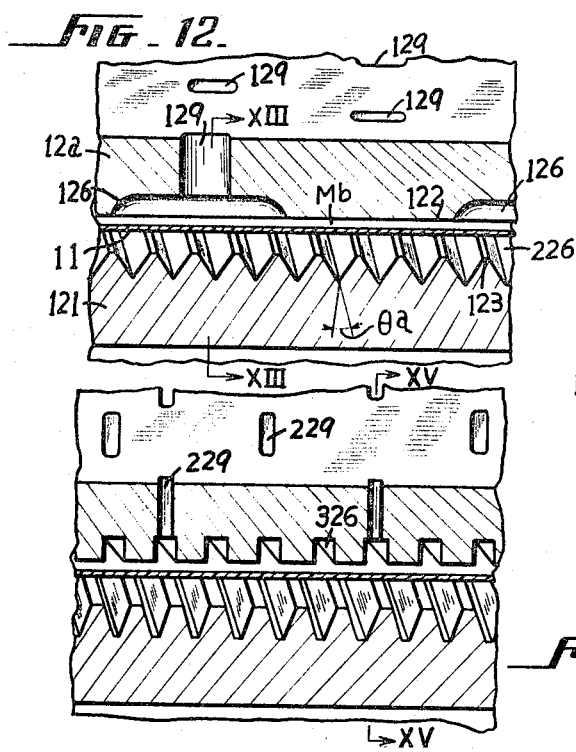
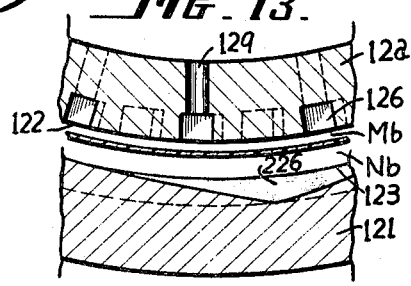
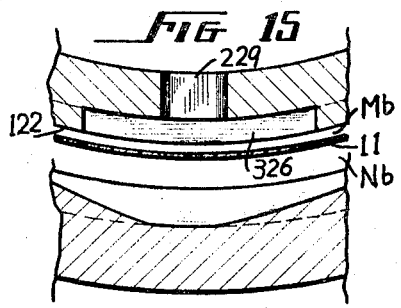

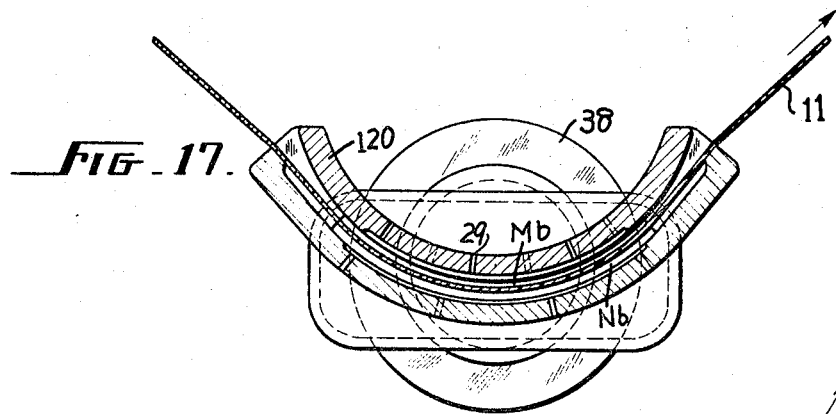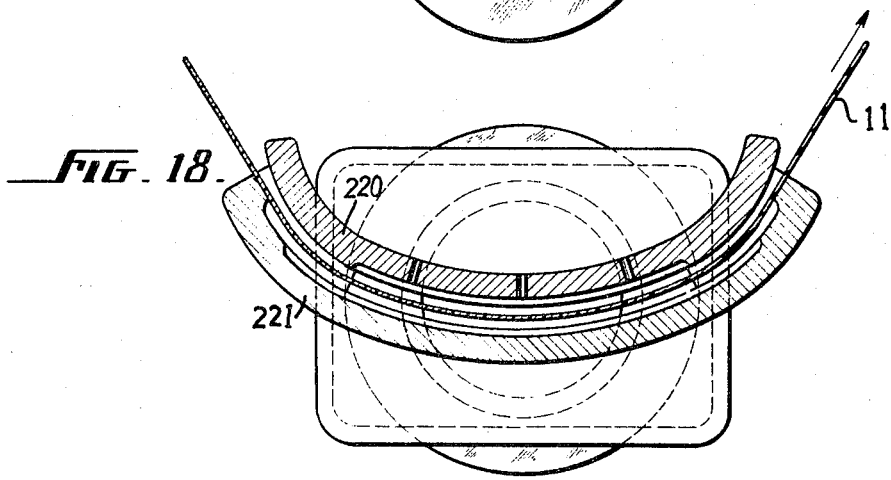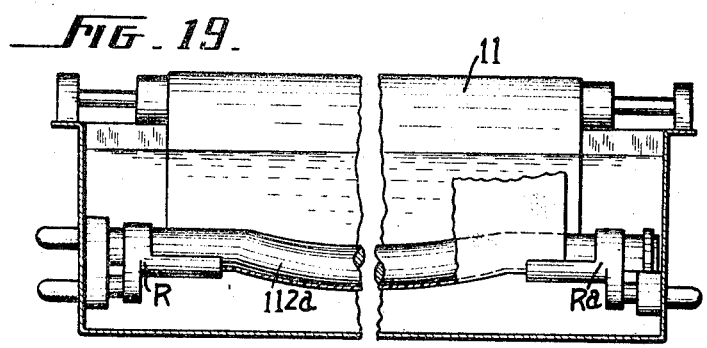

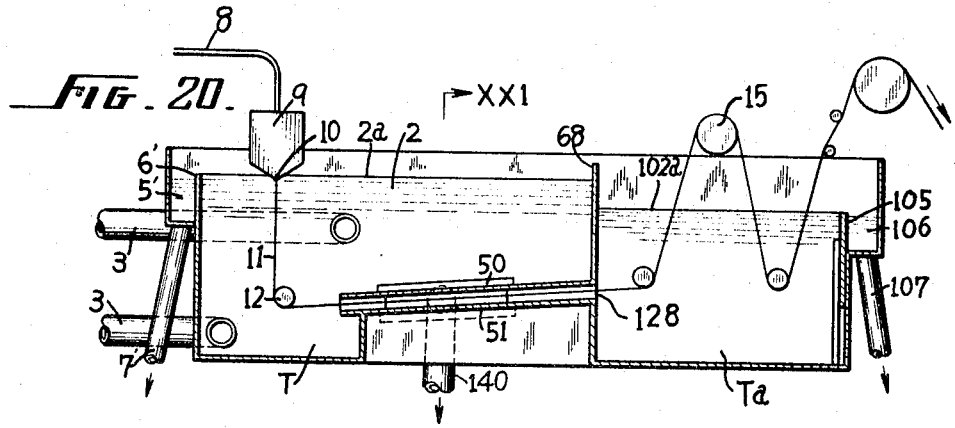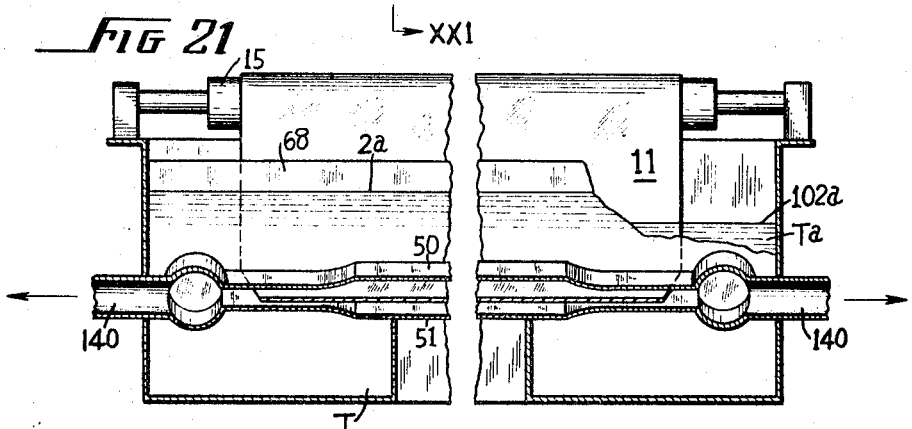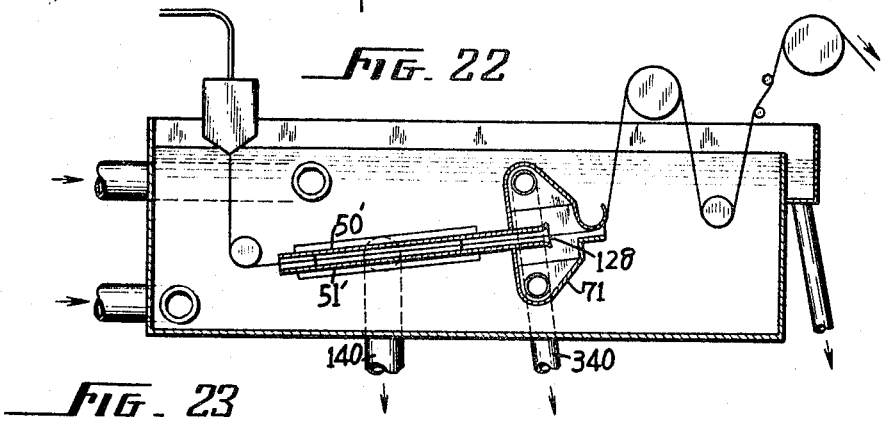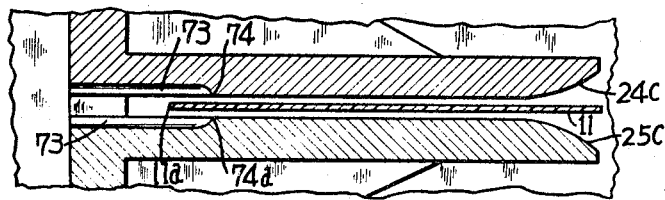

3,444,585
APPARATUS FOR HYDRAULICALLY STRETCHING FLEXIBLE WEBS WHILE PASSING THROUGH A LIQUID BATH
Morio Watanabe, 12/12, 2-chome, Shinden, Adachi-ku, Tokyo-to, Japan
Filed July 7, 1965, Ser. No. 470,133
Claims priority, application Japan, Aug. 31, 1964, 39/4,964; Mar. 1, 1965, 40/11,707, 40/11,708, 40/11,709
Int. Cl. B29c 17/02
U.S. Cl. 18—1                                    20 Claims

ABSTRACT OF THE DISCLOSURE

Lateral contraction of a flexible web passing through a liquid treating bath is compensated by a pair of hydraulic lateral stretching units each comprising a pair of parallel guide plates disposed within said bath enclosing predetermined opposed edge zones of the web passing therebetween, and a liquid circulating system operably associated with said bath, to maintain a pair of outwardly directed liquid streams between each pair of guide plates. Lateral stretching of the web is effected thereby by liquid friction with the web surface and adjusted, such as by a control of the extent of said zones, to substantially cancel the lateral contraction resulting from the elongation of the web during its passage through said bath.

---

This invention relates to improvements in and relating to the technique for stretching film sheets while being treated in a bath. More specifically it relates to the technique of laterally stretching a continuously running web, for instance, a cellulosic web, through a chemical treating bath such as a regenerating and coagulating bath.

Although this invention is applicable to various other purposes, it concerns mainly the manufacturing of regenerated cellulose webs through extrusion and casting. It is therefore intended hereinafter to disclose the invention as applied specifically to such field of manufacturing technique as mentioned above.

When the extruded regenerating liquid stock is cast from an extruder into a regenerating and coagulating bath, hereinafter referred to as "the bath," it is mechanically stretched considerably in its longitudinal direction while being carried by guide bars and squeeze rolls. While traveling through the bath, the web is subjected to considerable and complex stresses resulting from mechanical tensile forces, viscous fluid resistance forces, chemical reactions and structural alterations within or on the web. Generally speaking, however, the degree of longitudinal stretching of the web is substantially constant over the whole width thereof, while the lateral contraction is variable thereover, more specifically being largest at its marginal zones and smallest at the central zone. Since this contracting tendency is continuous and cumulative in the longitudinal direction of the web, the width thereof will be reduced gradually while traveling through the bath.

Assuming that the web travels through the bath at a speed ranging from 70 to 130 meters per minute, the longitudinal elongation and the lateral contraction will normally amount to 20–45% and 10–25%, respectively, of the initial values of the web as cast.

This distortion of the web results, as known to those skilled in the art, in a directional arrangement of the molecules which will cause the products to exhibit highly localized mechanical properties and strengths such as tensile strength, elongation, tearing strength and the like. This tendency will not only lower the grade of the products, but also entail a fluctuation in the width of the web, resulting in a considerable loss in production economy. With higher operating speed, this tendency will be accelerated to a corresponding or increased degree.

It is known to those skilled in the art to stretch mechanically the web in its lateral direction while it is traveling through the bath. Curved guide bars arranged in the bath for guiding the web have been suggested for this purpose, as shown for instance by U.S. Patent 2,311,755.

Considerable drawbacks have been encountered in the practice of this prior method due to uneven physical structure and unequal width of the cast webs.

According to another prior art such solution, as shown by U.S. Patent 2,313,125, viscose is spread upon the surface of a poured base while the latter is being moved or rotated and then led into a coagulation bath. A considerable drawback inherent in this solution resides in the great difficulty in selecting a proper thickness of the spread layer of viscose or the feed rate thereof in relation with the running speed of the web. A further drawback resides in the lack of eliminating the disadvantageous directional arrangement of molecules in the web, and of insuring an even width of the coagulated web.

According to the objects of the present invention, it is aimed to provide apparatuses for effectively preventing a possible lateral shrinkage of a treated web passing through a chemical bath.

It is still another object of the present invention to provide apparatuses for producing an improved cellulose film, sheet or web having superior physical properties and a substantially uniform width.

It is still another object of the present invention to provide improved apparatuses of the kind above referred to wherein the lateral stretching effort exerted upon a film, sheet or web while it is being treated in a bath is carried into effect by the utilization of liquid friction or fluid energy.

It is still another object of the present invention to provide apparatuses of the kind above referred to, wherein a higher running speed of the web or the like can be employed without sacrificing the desired characteristics of the web while being treated or coagulated in a bath.

These and further features, capabilities and advantages of the invention will appear from the following detailed description of specific embodiments thereof illustrated in the accompanying drawings in which:

FIG. 1 is a sectional schematic side view of a web-manufacturing plant embodying several of the lateral stretching units according to the invention;

FIG. 2 is a top plan view thereof;

FIG. 3 is an enlarged sectional view of one of the stretching units, taken along a section line III—III in FIG. 2;

FIG. 4 is a sectional view taken along a line IV—IV in FIG. 3;

FIG. 5 is an enlarged view of a part illustrated in FIG. 4;

FIG. 7 is part of an enlarged cross section taken on a line VII—VII in FIG. 2;

FIG. 10 is an enlarged longitudinal section taken on a line X—X shown in FIG. 2;

FIG. 12 is an enlarged view of a part of the unit shown in FIG. 10;

FIG. 13 is a cross sectional view taken on a line XIII—XIII in FIG. 12;

FIGS. 14 and 15 are similar views to FIGS. 12 and 13, respectively, showing a modification of that illustrated therein;

FIG. 17 is a cross section thereof;

FIG. 18 is a similar view to FIG. 17, showing a still further modified unit;

FIG. 19 is a cross section of a modified plant from that shown in FIG. 9, showing a possibility to combine the inventive arrangement with a mechanical lateral stretching mechanism;

FIG. 20 is a schematic longitudinal section of a coagulating and regenerating tank, showing a modified arrangement of that shown in FIG. 8;

FIG. 21 is a cross section of the tank shown in FIG. 20, taken on a line XXI—XXI shown therein with part thereof being broken away;

FIG. 22 is a similar view to FIG. 20, showing a still further modified form;

FIGS. 23–25 are several detailed cross sectional views, each showing main parts of a modified stretching unit.

Like reference numerals and characters denote like parts and magnitudes throughout the different views of the drawings.

Figure 6:
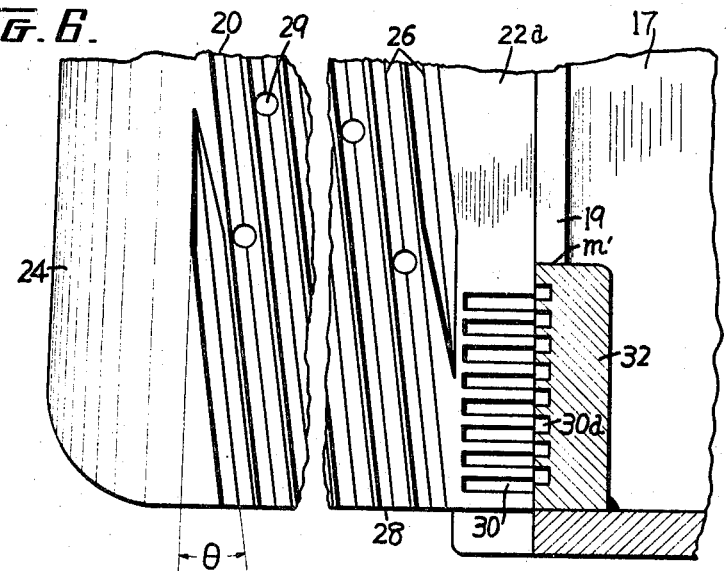
FIG. 6 is a sectional view of a part of the unit shown in FIG. 4, taken along a section line VI—VI thereof.

The following detailed description is directed to the technique for casting, regenerating and coagulating cellulosic material into film sheets, as a representative embodiment of this invention, without however being limited thereto.

Now referring to the accompanying drawings, especially FIGS. 1 and 2, the numeral 1 indicates generally a tank in which the cellulosic material is regenerated and coagulated. A supply piping 3 is properly arranged and supported alongside the tank and fitted with a plurality of perforated distribution branch pipes 4, 4a and 4b which project into the interior of the tank at lower levels than the free surface 2a of th eliquid bath 2 contained therein. The piping 3 is arranged to circulate the bath liquid as will be more fully described hereinafter with reference to FIG. 26.

Figure 26:
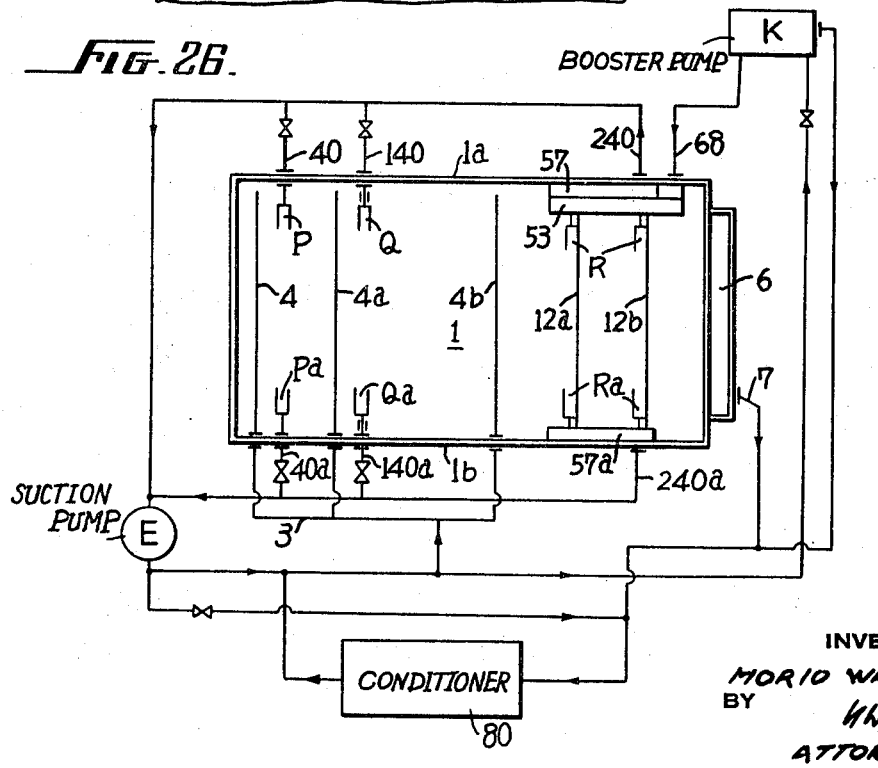
FIG. 26 is a schematic pipe line diagram for the plant shown in FIGS. 1 and 2, embodying a plurality of pairs of the novel stretching units.

A part of the tank wall as at 5 serves as an overflow wall for maintaining the liquid surface 2a at a predetermined constant level and defines a collector space 6 from which a conduit 7 extends downwards to a conditioner 80 (FIG. 26).

A viscose supply piping 8, only schematically represented, is connected to a conventional extruding hopper 9 which is partially dipped into the coagulating and regenerating bath, said hopper being formed with a slit opening 10 so as to cast the viscose continuously into a web 11 which is passed about a group of guides 12, 12a and 12b mounted fixedly in the bath, and about a group of positively driven rolls 15, 15a and 15b supported as at 13, FIG. 2, on the upper edges of the side walls 1a and 1b of the tank. These rolls are driven from a gear box 14 which is represented schematically in the drawing. A pair of hydraulically acting lateral stretching units P and Pa are arranged at both sides of the path of the web between slit opening 10 and first guide 12.

In combination with the first stretching units P and Pa a second pair of slightly modified stretching units Q and Qa is arranged along the path of the web extending from guide 12 to driven guide roll 15. Under circumstances, however, these second units only may be provided and the first pair of units dispensed with. Still further modified stretching units R and Ra are arranged in combination with guides 12a and 12b as will become clear as the description proceeds. During travel along the said guides and driven rolls, the web is subjetced to a desired chemical treatment such as coagulation and regeneration while being stretched both in the longitudinal direction mechanically and at the same time hydraulically in the lateral direction according to the invention, and then subjected to a succeeding treating step such as drying, as indicated only by arrow H. There are provided a pair of conventional doctors 16 and 16a which are adapted to wipe superfluous liquid off the web surfaces.

The composition, temperature, etc. of the treating bath 2 depend upon the kind, nature and treatment of the web 11. For instance, in the case of coagulating and regenerating of a web of regenerated cellulose, the liquid stock extruded from the hopper 9 will comprise generally a viscose including 6–10% of cellulose and 5.0–6.5% of caustic soda while the liquid bath 2 contains normally 10–18% of sulphuric acid, at least 16% of Glauber's salt and proper quantities of conventional additives, the temperature of the bath being kept preferably between 30° and 45° C. Although the basic width of the web depends upon that of the extruder slit opening 10, it would otherwise contract greatly and laterally under the influence of the chemical reaction as well as by mechanical stretching in the longitudinal direction, if the aforementioned lateral stretching units P, Pa, Q, Qa, R and Ra should not be provided.

It is interesting to note that the stretch of such a web 11 will increase as a function of its contacting period with the treating bath during which the desired coagulating and regenerating reaction takes place. Directly after the extrusion process, the stock has coagulated surfaces only with the inner part therebetween being in a viscous and amorphous state. The stock will be thickened gradually in proportion to the 0.5 power of the coagulating period.

Next, referring to FIGS. 3–6, one of the first stretching units P will be more fully described. This unit P is formed substantially in the shape of a liquid-containing box 17 which is fixedly mounted on the side wall 1a and provided with an inwardly directed elongated suction opening 19 from the upper edge of which extend an inwardly projecting stationary fluid guide plate 20 and a movable fluid guide plate 21 arranged normally in parallel with the former and made integral with a movable wall 18 constituting a part of the box 17 and hinged thereto as at 33, when the movable wall is positioned as shown in FIG. 4 in full lines, the oppositely faced fluid guide surfaces 22 and 23 of the plates 20 and 21 respectively are substantially in parallel with the traveling web 11 and spaced by equal distances therefrom as indicated by symbols M and N, respectively. Thus, both guide plates embrace a considerabel end zone along one of the edges 11a without any physical contact therewith. The free ends 24 and 25 of the said guide plates are flared outwardly and oppositely so as to allow of easy entering of the bath liquid into the gap space between the both guide plates causing the liquid flow to pass from the left to the right as seen in FIGS. 3 and 4. On the substantial part of each of the surfaces 22 and 23, there are provided a number of grooves 26, FIG. 5, arranged in parallel with the traveling direction of the web, or inclined a small angle relative thereto as denoted at Q in FIG. 6. Each of these grooves extends over the whole width of its respective guide plate, more specifically from their leading edges 27 for the web to their trailing edges 28 which are most clearly seen in FIG. 3. The depth of each of these grooves may preferably be in the order of 2–8 mm. Each of the guide plates is formed with a number of perforations 29 for letting the liquid pass from the bath and from both outside surfaces of the guide plates through these perforations into the said gap space defined by the plates. The perforations are preferably of round shape each having normally a bore size of 3–8 mm. If desired, the perforations may be elliptical and inclined vertically in the lateral direction or in the longitudinal direction or both. It is preferably that each of these perforations opens at a bottom of the groove 26. The profile of the groove may be rectangular, semicircular, trapezoidal or of any properly selected shape. Along the root of each of the guide plates, when seen on the inside surface, there is a plain zone 22a or 23a which is in opposition to the extreme edge 11a of the web to be stretched. A plurality of lateral grooves 30 are formed on the plain zone 22a or 23a, respectively, FIGS. 4 and 6, in the neighborhood of either the leading or trailing edge 27 or 28, precisely or substantially, at right angles to the longitudinal grooves 26 and in close proximity of side walls 31 and 32, respectively, which define the both extremities m and m' of the opening 19 so as to limit the length thereof to a properly selected value. A plurality of auxiliary ducts 30a are formed in the related surface of side walls 31 and 32 so as to lead the bath liquid flowing from the said leading and trailing edges into the interior liquid space of the box 17. The opening 19 has preferably over its whole width a constant height, or alternatively a gradually increasing height when seen in the traveling direction of the web.

The movable wall 18 fitted integrally with guide plate 21 is kept in its deflected position as indicated by chain-dotted lines in FIG. 4 when the plant is at rest. A sealing member 34 is provided in the mating wall part of the box 17 so as to seal tightly the hinged wall connection 33 so as to prevent any fluid leakage therethrough while the plant is in operation. For the purpose of locking the guide plate 21 in its operative position, pins 35 and 35a (FIG. 3) are inserted into corresponding openings h bored in line through ribs 31a as well as stationary auxiliary walls 36 and 36a, respectively. An outwardly directing conduit 37 is provided integrally with the box 17 so as to establish a fluid connection with the interior space thereof, and formed with a connecting flange 38 adapted to be bolted to the side wall 1a of the treating bath having a fluid passage 39 bored through the said wall. A suction conduit 40 is formed with an inwardly directing branch 40p having a connecting flange 40q which is bolted to the said side wall 1a for establishing a fluid connection with the passage 39. During operation of the plant, the interior of the conduit 40 is kept at a negative pressure under the action of a static head or alternatively by a controllable suction pump E, only schematically represented in a circulating piping diagram illustrated in FIG. 26. Guide 12 is rigidly supported at its extremities by means of conventional supports one of which 41 is shown in FIG. 3, being mounted fixedly on the auxiliary wall 36a.

The unit P comprising guide plates 20 and 21, liquid containing box 17, suction opening 19 and suction conduit 37 is arranged in a symmetrical opposite relation to the similar unit Pa and these both units are disposed respectively along the lateral edges 11a and 11b of the traveling web. Under circumstances, however, the unit movable wall 18, hinged connection 33 and locking pins 35 and 35a of unit Pa may be dispensed with, although this unit is necessarily connected hydraulically with pump E and discharge conduit 40a so as to operate symmetrically and in unison with the first mentioned unit P.

When the plant is in operation, the pump E operates and the interior spaces of liquid boxes 17 of both units P and Pa are kept at a reduced pressure which causes the liquid prevailing in the gap spaces M and N above and below the side portions of the traveling web to flow towards suction openings 19 and thence to the boxes 17. Although a quantity of the bath liquid flows through the leading and trailing openings defined between the corresponding pairs of plate edges 27 and 28 into the gap spaces M and N, the main currents of the sucked-in liquid will be caused to flow through the regular inlet mouths, each defined by the entrance edges 24 and 25, respectively, into the said spaces, laterally and oppositely in the outward directions at right angles to that of the traveling web. These lateral liquid flows create fluid frictional forces acting upon the web surfaces depending upon the velocity and viscosity of the liquid and in the oppositely lateral directions and with substantially equal efforts when the both units P and Pa are properly designed, dimensioned and controlled. In this way, the web while traveling longitudinally at a predetermined constant speed and being stretched mechanically, is thus subjected evenly and continuously to outwardly and oppositely directing hydraulic stretching actions. Since these hydraulic stretching forces depend naturally upon the velocity gradient of the flowing fluid in contact with the traveling web being acted upon, they may be regulated as desired by adjusting the sucking capacity of the pump E or the opening degree of the attached valves.

As will be appreciated, the stretching effort depends naturally upon the width of each of the marginal zones in which the artificial lateral fluid flow exists, or more specifically on the zone defined by each pair of guide surfaces 22 and 23. As shown in the first embodiment so far described, the width of the guide plate 20 or 21 is smallest at its leading edge 27 and largest at its trailing edge 28, and thus the lateral stretching effort will naturally become larger from the leading to the trailing edge of the guide plate. As for the distribution of the lateral stretching intensity, it is substantially nil at the longitudinal edge 11a or 11b of the web and increases gradually towards the longitudinal axis of the web within the stretching zone. The central zone inwardly of the pairs of the innermost extremities 24 and 25 will be subjected to a lateral stretching force of a certain, substantially constant value. Thus, the lateral stretching force will become larger as the coagulating and regenerating reaction proceeds and as the solidifying and stretch-resisting force of the web become larger. This kind of the unique hydraulic stretching is highly advantageous in comparison with the conventional mechanical technique wherein possible breakage or mechanical damage are involved especially along the longitudinal edges of the web while being laterally stretched.

The provision of longitudinal grooves 26 on the guide surfaces 22 and 23 will effectively serve for reducing the possible fluid resistance in the longitudinal direction acting on the running web and hemming the lateral flow of the liquid in the close proximity of the guide surfaces. Thus, the lateral liquid flow in this area will be maximum in the close proximity of the film surfaces, thus providing a maximum stretching force upon the related web surface.

Even with larger sizes of flow passages M and N and stronger sucking force adopted under circumstances, the flow rate of the stretching liquid will be of a lower value than expected, resulting however in a rather large stretching force.

The provision of perforations 29 will serve for allowing flows of the fluid from the bath into the aforementioned lateral passages M and N to a considerable degree for serving to suppress possible disadvantageous fluctuating movement of the web within the lateral stretching zones thereof. These perforations will serve in addition to impede effectively a possible counter-flow from the side of the trailing edge 28 in the reverse direction relative to the running direction of the web, thus minimizing the traveling load of the latter.

When the grooves 26 are arranged at an angle, the angle of inclination θ will serve to minimize a possible local concentration of the stretching effort resulting from a constant establishment of cooperation of a certain specific zone of the longitudinal grooves 26.

When the suction opening 19 has a constantly increasing, properly dimensioned height, as already mentioned, when seen in the traveling direction of the web, the fluid stretching force thus provided will correspond to the coagulated strength of the web. When the variable height of the suction opening is properly selected upon carrying out a plurality of practical experiments, the lateral flow rate of the liquid may be substantially a constant value to compensate the variable width of the guide plates if this measure be employed in a preferred manner as already mentioned.

In a modified embodiment of the fluid stretching unit $\theta$ shown in FIG. 7 and arranged along the upwardly inclined path of the web defined by the guide 12 and roll 15 and in opposition to a similar unit $\theta a$ (see also FIG. 1), a stand supports a guide member 43 which is formed with a pair of guide grooves 100, although only one is shown herein. In the present embodiment, both guide plates 20' and 21' are rigidly connected with a liquid box 17' and the latter plate is provided rigidly with a pair of slides 44, only one of which is seen in the figure. These slides are mounted slidably in the guide grooves 10 for providing an adjusting possibility of the lateral position of essential parts of this unit Q. The box 17' is formed integrally with an outwardly extending tubular projection 137 which is formed on its outside surface with male screw threads 137a and received slidably in the bore of a guide tube 45 having at its outer end a flange 138 bolted to the tank wall 1a. An adjusting member 46 in the form of a knob is loosely mounted on the outside periphery of the stationary tube 45 passing through a bore 39 in the tank wall, said member being formed with male screw threads 46a in engagement with the threads 137a. Stop ring 47 of split construction is formed in its inside periphery with a circular recess 47a in engagement with a collar 48 formed on the tube 45, thus the former being effectively prevented from any axial movement along the axis of tube 45. In a similar way, the member 46 is connected through a tongue-and-groove connection with stop ring 47, thus being effectively locked against axial movement. It will be clear from the foregoing that by turning the adjuster 46 in one or another direction, the working parts of the unit Q can be shifted either in the outward or inward direction so as to meet with occasional variation in the required width of the web to be hydraulically stretched. Suction piping 140 coming from the pump E is formed at its end shown with a fixing flange 140a' which is bolted to the aforementioned fixing flange 138 and ensures thereby a fluid connection through the bores of tubes 45 and 137 with the liquid space of the box 17'. Further construction and function are similar to those in the foregoing embodiments.

Figure 8:
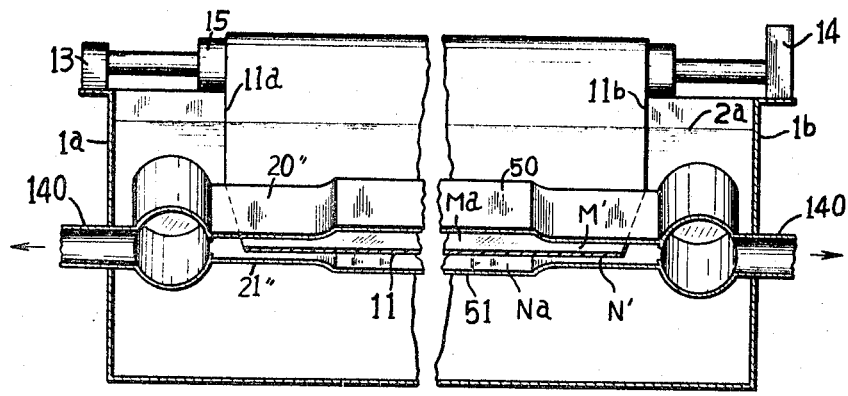
FIG. 8 is a sectional view of a modified embodiment according to FIG. 1, taken on a line VIII—VIII thereof.

In a further modified form shown in FIG. 8, the upper guide plates 20'' of the both units are rigidly connected by means of a connecting plate 50. In the similar way, a lower guide plate 21'' of both units is connected rigidly by means of a connecting plate 51.

Since the guide plates are flared as before at their inner ends, the flow passages Ma and Na formed above and below the web 11 and within the space defined by the both connecting plates 50 and 51 are broader than those denoted by symbols M' and N' which are formed within the flow space defined by the each pair of guide plates 20'' and 21''. By the above-mentioned specific arrangement, the fluid resistance acting upon the traveling web 11 at both central surfaces thereof will be considerably reduced in comparison with the case wherein the flow passages above and below the web are of a constant width.

Perforations as described hereinbefore with reference to those denoted by 29 in FIGS. 5 and 6 may preferably be provided also in the guide plate 20'' and 21'', respectively. Further, similar perforations can be formed in the connecting plates 50 and 51, especially in the neighborhood of the joints thereof with the respective guide plates.

The modification shown in FIG. 8 is advantageously employed in such cases in an effort laterally stretching webs of narrower width, for suppress adverse fluctuations of the web. This arrangement provides a possibility to stretch the web under highly stabilized conditions of the liquid flow.

Figure 9:
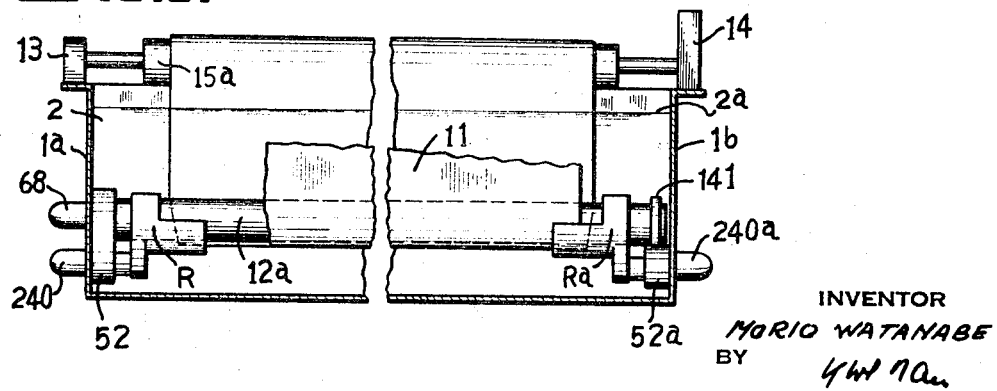
FIG. 9 is a schematic cross section taken on a line IX—IX shown in FIG. 1.

FIG. 9 is a schematic view of a pair of still further modified stretching units R and Ra which are adapted to stretch the web 11 at its specific zone in contact with guide 12a, FIG. 1. FIGS. 10–13 illustrate the details of one of units R and Ra.

The guide 12a is made into a hollow cylinder, as most clearly seen in FIG. 10, having a longitudinal bore 153 extending throughout substantially the whole length thereof and serving as a liquid passage which is closed at its righthand end as viewed in FIG. 9. This closed end is kept in position by means of a holder 141 while the lefthand or open end is received in an opening 54 which is formed through the wall of an upper chamber 53 of liquid box 52. Sealing ring 55 and pressure plate 56 are provided for establishing a liquid tight connection between the opening 54 and the end of guide cylinder 12a which guides the web 11 through the intermediary of a liquid layer of considerable thickness. In the proximity of each of the extremities of the guide cylinder, there is provided a liquid guide 121 having a generally concave guide surface 123 in spaced and opposed relation with the lower and active convex surface 122 of the cylinder 12a. The plate 121 is flared again at its inner end so as to form a liquid inlet 125 in combination with the cylinder 12a. The outer or outlet end 119 of the liquid guide space opens into the interior of a liquid box 17'' as shown.

Liquid box 17'' is formed with an outwardly extending connecting conduit 137 arranged in parallel with the guide cylinder 12a which conduit is slidably received in a sleeve 145 which is fixedly mounted in a corresponding opening through the wall of a suction box 57. An adjusting ring 46 is formed with female screw threads 46a which are in meshing relation with the corresponding male screw threads 137a formed on the outside periphery of conduit 137, thus the said ring 46 being rotatable about its longitudinal axis, yet positively prevented from its longitudinal translation by means of a stop 47b which is rigidly attached onto the wall of suction box 57 and in engagement with the ring through the intermediary of a tongue-and-groove connection as shown. As a consequence, in the same way as before, essential working parts of the present unit may be adjusted as desired in one or the other lateral direction by turning the adjusting ring 46.

Valve member 58 is rigidly connected with its spindle 58a which passes threadedly through the wall of liquid box 17'' and is provided with a hand wheel 59 accessible from the interior of the coagulating tank. When the valve 58 is advanced to or retracted from the inlet end of the conduit 137 by turning the wheel 59, in one direction or another, the flow rate of the sucked-in liquid through the conduit may be adjusted as occasion may arise.

A guide tube 60 is made integral with liquid box 17'', said tube being slidably mounted on the guide cylinder 12a, a guide pin 61 passing threadedly through the upper wall of the said tube. The inner end of the upper wall of the latter projects a considerable distance inwardly from the remaining part and slidably abuts on the upper wall of the cylinder 12a as at 62. The cylinder is formed therein with an elongated slot 63 which receives slidably the guide pin in receiving hole 67 bored through the wall of an inner tube 64 mounted in the bore 153 of the guide cylinder 12a through the intermediary of a pair of sealing rings 65 and 65a. The bore 64b of the inner tube provides a liquid passage as will be described hereinafter. Between the inside wall surface of the guide cylinder 12a and the outside cylindrical surface of the inner tube, there is a closed ring space 66 defined at its both extremities by sealing rings 65 and 65a, thus the tube being slidable axially relative to the cylinder. In spite of the provision of the slot 63, the space 66 is kept substantially closed thanks to the tight closure provided by the projecting tongue 62.

Figure 11:
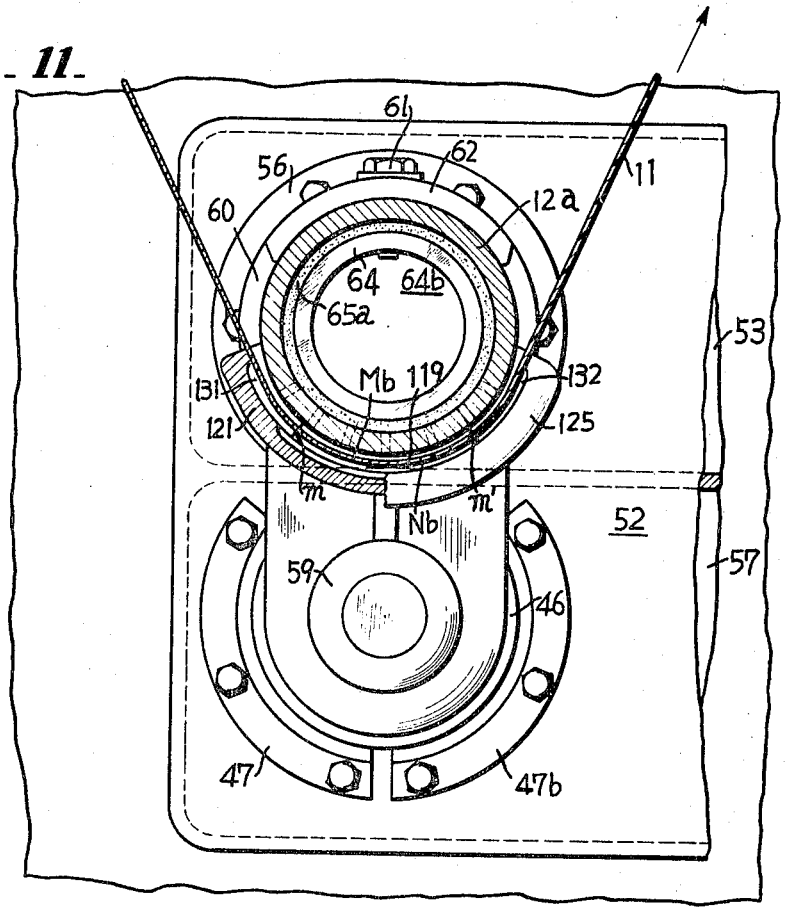
FIG. 11 is an end view of the unit shown in FIG. 10, as seen from inside to outside of a viscose casting plant, the view being shown partially in section for better illustration of inner constructional parts.

By turning the adjusting ring 46 in one or another direction, the movable assembly comprising liquid box 17", guide member 121, guide tube 60 and inner tube 64 is shifted either inwardly or outwardly along the longitudinal axis of the guide cylinder 12a, yet the inner end 64a is kept always in a constant relation relative to a pair of separated lands 131 and 132 of curved guide member 121 (see FIG. 11). In this case, the closed space 66 will shift correspondingly so that a predetermined zone of the internal wall surface of guide cylinder 12a is prevented from contacting with the liquid passing through the passage 153 as will be more fully described hereinafter and this zone thus interrupted from liquid contact may be varied in its position relative to the aforementioned lands 131 and 132. The part of the outside peripheral surface 122 of cylinder 12a which lies in opposition to the inside concave surface 123 of guide member 121 is formed with a plurality of longitudinal rows of interrupted grooves 126, as most clearly seen in FIG. 12, as well as number of connecting passages 129 milled through the wall of cylinder 12a each of said passages being in fluid connection with one of the grooves 126. Concave guide surface 123 is formed with a number of lateral grooves 226 arranged in parallel one after another, yet slightly inclined at an angle of $\theta a$ (FIG. 12) relative to the longitudinal axis of guide member 121. The area of the convex guide surface 122 which is formed with grooves 126 and passages 129 is so selected that it covers the corresponding edge 11a of the running web, as most clearly seen from FIG. 10. Cylinder 12a comprises a liquid box 52a which consists exclusively of a suction chamber 57a, although this symbol does not appear on the drawing. Suction chambers 52 and 52a are fixedly attached to the side walls 1a and 1b, respectively, of the tank 1. Liquid chamber 53 is kept in fluid communication with a pressure liquid piping 68 and suction chambers 57 and 57a are connected to suction pipings 240 and 250a, respectively, FIG. 26. The piping 68 is supplied with pressurized liquid, preferably the circulating bath liquid, as clearly seen from FIG. 26, from a circulating or booster pump K and delivers it to liquid chamber 53 as already referred to, normally at a relatively low pressure between 0.2 and 1.3 kg. per square centimeter, while suction pump E sucks liquid from suction chambers 57 and 57a through the related pipings 240 and 240a, respectively.

When suction pump E starts, chambers 57, 57a and 17" are kept at a reduced pressure and the bath liquid prevailing in spaces Mb and Nb defined by concave guide surface 123 and web 11, on the one hand, and by convex guide surface 122 and the web, on the other hand, is caused to flow through outlet end 119 into the liquid box 17".

When booster pump K is then started, liquid is supplied under pressure from piping 68 to liquid chamber 53, thence to the flow passage 153. The supplied liquid flows then through the openings 129 to upper gap space Mb. But, those openings 129 which are covered by closed space 66 are also ineffective, because they are insulated from communication with flow passage 153. Thus, those openings 129 which are effective in this sense are limited to those situated in opposition to the web 11. The fed liquid through these effective openings 129 urges the related marginal zone of the web to move radially outwards so as to increase the gap space Mb, and is then discharged through outlet opening 119 into the liquid box 17". The provision of a number of interrupted grooves 126 described hereinbefore serves to accelerate this kind of liquid flow, yet effectively prevents otherwise possible direct rushing of the liquid from openings 129 onto the upper surface of the web. In this way, the web is subjected to the required hydraulic lateral stretching action even though it travels along a curved passage.

In a modified unit shown in FIGS. 14 and 15, each of the interrupted grooves 126 shown and described in the foregoing embodiment is somewhat modified so as to represent a spiral groove 326 having a square configuration. Each of the liquid passage openings 129 in the foregoing embodiment is also slightly modified so as to show a considerably elongated configuration when seen in the peripheral direction in comparison with that which is an axially elongated configuration in the foregoing embodiment. By employing these measures, the liquid delivery pressure of pump K can be increased so as to develop a higher urging pressure in the upper gap space Mb for the realization of a stronger lateral stretching. The modified openings are shown herein by 229.

Figure 16:
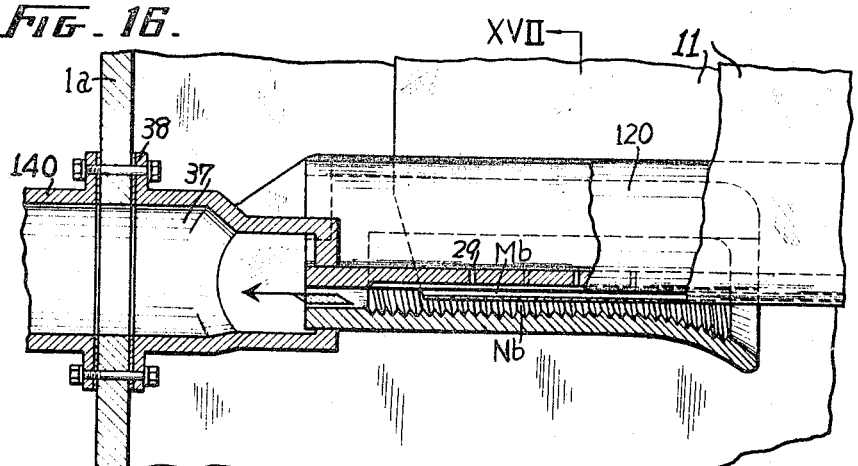
FIG. 16 is a longitudinal section of a simplified and modified fluid stretching unit from that shown in FIG. 10.

In a modified arrangement shown in FIGS. 16 and 17, the web is guided along a relatively obtuse curved passage in comparison with the preceding embodiment shown in FIGS. 9–15. In the present modification, means adapted to supply positive pressure liquid through perforations 129 in the convex guide wall have been dispensed with. Adjusting means for guide cylinder 12a which is replaced by a cross sectionally curved plate 120 in this case, have been also dispensed with.

Suction mouthpiece 37 is flanged to the inside surface of tank wall 1a as at 38. On account of the obtuse curved passage of the web, the pressure difference between the upper and the lower fluid space Mb and Nb at the both sides of the traveling web can be selected to be relatively small so that a negative fluid pressure therethrough will produce effectively the desired lateral stretching of the web, without relying upon any positively pressurized fluid through perforations 29, through which in this case the bath liquid having a slight static head is led to pass.

In a still modified embodiment shown in FIG. 18, convex guide member 220 and concave guide member 221 have fluid guide surfaces having gradually decreasing radius of curvature. With this modified arrangement, the pressure difference between the upper and lower fluid guide spaces necessary for guiding the web along a curved passage and fluid-stretching thereof in the lateral direction can be reduced in comparison with that as met with the preceding modification shown in FIGS. 16–17.

In afurther embodiment shown in FIG. 19, a curved guide bar 112a is combined with a pair of fluid-stretching units R and Ra The bar 112a serves for the physical stretching of the traveling web 11 in the opposite lateral directions by sliding contact therewith, whereby lateral forces are produced physically which are functionally combined with the fluid-stretching forces produced by the provision of the pair of stretching units R and Ra.

In a still further embodiment of the invention shown in FIGS. 20 and 21, the web is fluid-stretched in the lateral direction, yet prevented from excessive longitudinal elongation of the web. During travel through the bath, for instance at a speed of 2 meters per second, the bath liquid will provide a high fluid resistance to the running web, which results in a considerable longitudinal elongation thereof due to the mechanical pull provided by the positively driven roll such as denoted by numeral 15. Thus, it will be clear by impeding the otherwise possible higher longitudinal elongation of the web, the lateral stretching effect provided by the invention will be influenced considerably.

In this arrangement, the tank is divided into two adjoining compartments T and Ta by the provision of a separating wall 68 for the creation of different liquid heads. The head in the leading compartment T is kept higher than that in the trailing compartment Ta. The former compartment is fitted with liquid supply piping 3 as before for the circulation and replenishment of the bath liquid. One of the end walls as at 6' of the leading compartment serves as overflow means for keeping the liquid level in the compartment T at a constant level 2a, the overflown liquid is accumulated in a receiver 5' from which a discharge pipe 7' extends and constitutes a part of the liquid circulating system shown in FIG. 26. In the similar way, the adjustable end walls as at 105 of the second compartment serves as overflow means so as to keep the liquid level 102a therein at a lower constant height. This compartment is fitted equally with an overflow receiver 106 from which a discharge pipe 107 extends, constituting a part of the liquid circulating system shown in FIG. 26.

Upon leaving the hopper 9, the web 11 is led around a guide bar 12 as before and thence between a pair of a guide plates 50 and 51.

The fluid space between these plates opens through separating wall into the second compartment Ta, whereby the bath liquid is led longitudinally along the traveling web for reducing the otherwise possible fluid resistance acting thereupon. In this arrangement, a pair of laterally stretching units similar to those which have been set forth hereinbefore with reference to FIG. 8 are also provided for fluid-stretching the web in its both lateral directions with equal efforts, these units Q' and Qa' being clearly shown in FIG. 21.

In a modified arrangement shown in FIG. 22 from that shown in FIGS. 20 and 21, the longitudinal fluid stretch-hemming effect is attained by a powered suction means instead of utilizing the statical head.

In this arrangement, the tank is not divided into compartments. Instead, an immersed suction chamber 71 is arranged so as to enclose the outlet end 128 of the liquid flow passage defined between a pair of fluid guide plates 50' and 51', through which passage the web 11 is led and which is also connected to suction pipes 140 and 140a constituting part of the bath liquid circulating system shown in FIG. 26. Chamber 71 is fluidically connected through pipe 340 to pump E (FIG. 26). Although not shown, laterally acting fluid stretching units are provided in the same manner as the foregoing embodiments.

In an embodiment of hydraulic stretching unit shown in FIG. 23, a pair of liquid guide plates 24c and 25c are provided in the similar way as before. These plates are however recessed as at 73 and 73a, respectively, at the root portions thereof. As shown, the inner ends 74 and 74a are positioned for instance 5–20 mm. inwardly away from the corresponding side edge 11a of the web. By this way, a possible minor lateral movement of the web does not cause unbalanced lateral stretching efforts at the both sides of the web to take place. Thus, the web may run under well balanced lateral stretching condition.

Figure 24:
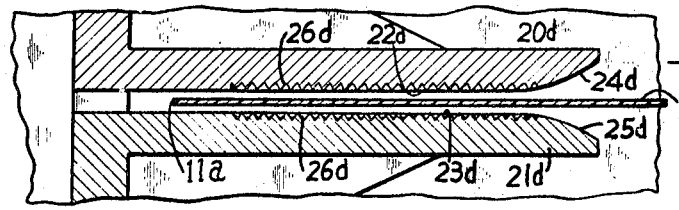

A similar effect can be obtained by the provision of a number of longitudinal flow-guiding grooves 26d in the liquid guide surfaces 22d and 23d of parallel guide plates 20d and 21d, respectively, yet leaving a blank zone covering a marginal zone of the web, as shown in FIG. 24.

Figure 25:
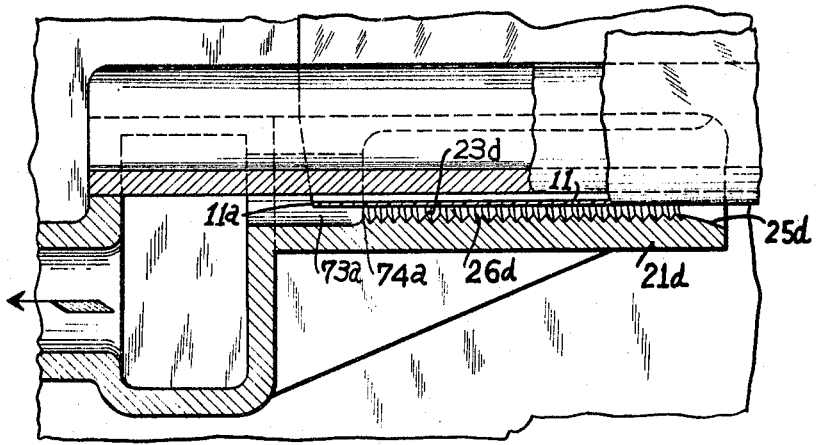

A combination of the both features described above may serve for the same purpose, as embodied in a modified unit shown in FIG. 25. Like reference symbols to those shown in FIGS. 23 and 24 are used in this figure for comparison with predominant constructional features in this case. Thus, the description as set forth above with reference to FIGS. 23 and 24 will apply also to this combined embodiment.

Obviously, the invention is not limited to the specific constructions illustrated as the principle thereof could be employed irrespective of the particular construction of the related plant and the specific kind and nature of the web-forming material and treating bath. For instance, the principles of the invention may be equally applicable to a physically treating bath such as adapted to stretch a web laterally in a hot aqueous medium such as treated water.

Having thus clearly described the nature of the invention, what is claimed as new and secured by Letters Patent is:

1. Apparatus for laterally stretching a web passing through a liquid bath comprising a pair of hydraulic stretching units disposed within said bath each in the vicinity of one of the edges of said web, each of said units having a pair of guide surfaces disposed on the opposite sides of said web and each of said guide surfaces extending to a predetermined distance inwardly of and embracing marginal zones of said web having a predetermined length in the running direction of the web, and means to cause a pair of laterally opposite liquid streams between said surfaces and outwardly over said zones, whereby to create a lateral stretching effect by liquid friction affecting said web.

2. Hydraulic web stretching apparatus as claimed in claim 1, said last means being comprised of a liquid circulating system operably associated with said bath and having its suction side connected to said units.

3. Hydraulic web stretching apparatus as claimed in claim 2, including a tank containing said bath, a pair of inlet means of said circulating system supported by said tank, a suction chamber connected to each of said units, a slidable connecting between the respective suction chambers and inlet means, and adjusting means to adjust said chambers relative to said inlet means, to shift said units inwardly and outwardly relative to the longitudinal axis of said web.

4. Hydraulic web stretching apparatus according to claim 1, wherein said surfaces are provided by a pair of plane guide plates pivotally mounted relative to one another.

5. Hydraulic web stretching apparatus as claimed in claim 1, wherein said surfaces are provided by a pair of guide plates formed with a plurality of parallel grooves extending substantially in the traveling direction of the web, whereby to impede the lateral liquid flow in the vicinity of said surfaces and to accelerate said flow in the vicinity of said web.

6. Hydraulic web stretching apparatus as claimed in claim 1, wherein said surfaces are provided by a pair of guide plates, at least one of said plates having a number of perforations therethrough.

7. Hydraulic web stretching apparatus in claim 1, said bath consisting of a coagulating and regenerating liquid and said web consisting of viscose.

8. Hydraulic web stretching apparatus as claimed in claim 1, both said units being physically connected with one another by a pair of parallel connecting plates enclosing therebetween a wider passage for said web than the passage provided by said units.

9. Hydraulic web stretching apparatus as claimed in claim 1, wherein the leading edges, in respect to the traveling direction of said web, of the spaces defined by said guide surfaces has a lesser width than the trailing edge thereof, to produce a longitudinal liquid flow impeding the physical elongation of said web.

10. Hydraulic web stretching apparatus as claimed in claim 9, including a suction chamber connected to the trailing end of the liquid spaces defined by said guide plates, to maintain a longitudinal liquid flow impeding the elongation of said web.

11. Hydraulic web stretching apparatus as claimed in claim 1, wherein said liquid guide surfaces are provided by a partial surface of a hollow cylinder and a curved guide plate in spaced relation to said surface.

12. Hydraulic web stretching apparatus as claimed in claim 11, wherein said hollow cylinder is provided with a plurality of perforations with the inner space thereof serving as a pressure fluid chamber, to urge the web to be stretched towards the concave surface of said guide plate by pressure fluid admitted through said perforations.

13. Hydraulic web stretching apparatus as claimed in claim 11, the convex liquid guide surface of said cylinder being formed with rows of interrupted axial grooves, to accelerate the axial liquid flow along the web.

14. Hydraulic web stretching apparatus as claimed in claim 11, including a spiral groove having a square cross-section formed in the convex liquid guide surface of said cylinder, to narrow the axial liquid flow and to impede physical elongation of said web.

15. Hydraulic web stretching apparatus as claimed in claim 11, including an inner tube slidably mounted within said cylinder, to provide a positive liquid pressure passage, said cylinder having a number of perforations, to admit liquid under pressure to the gap between the web and said cylinder, said tube overlying a fractional number of said perforations.

16. Hydraulic web stretching apparatus as claimed in claim 1, wherein said liquid guide surfaces are provided by a pair of guide plates each having a curved cross-section.

17. Hydraulic web stretching apparatus as claimed in claim 16, wherein the cross section of said guide plates has a variable radius of curvature, being largest at the center and smallest at the extremities of the plates.

18. Hydraulic web stretching apparatus as claimed in claim 1, including a curved fixed bar intermediate said units, and engaged by said web, to effect lateral stretching of said web by combined mechanical and hydraulic action.

19. Hydraulic web stretching apparatus as claimed in claim 1, including a recess formed in the root portion of the liquid guide surfaces, to create an idle space around the edge of the web.

20. Hydraulic web stretching apparatus as claimed in claim 1, including flow control means to adjust the intensity of said liquid streams.

References Cited
UNITED STATES PATENTS

| | | | |
|---|---|---|---|
| 2,473,404 | 6/1949 | Young | 18—1 |
| 2,719,323 | 10/1955 | Thompson | 18—1 |
| 2,926,104 | 2/1960 | Goetz | 18—15 X |
| 2,988,802 | 6/1961 | Tomonari et al. | 18—8 X |
| 3,073,733 | 1/1963 | Mitchell | 18—8 X |
| 3,344,474 | 10/1967 | Davis et al. | 18—15 |

WILLIAM J. STEPHENSON, *Primary Examiner.*

U.S. Cl. X.R.

18—12, 15; 264—288